US012596508B2

(12) United States Patent (10) Patent No.: US 12,596,508 B2
Sugiyama et al. (45) Date of Patent: Apr. 7, 2026

(54) INFORMATION PROCESSING SYSTEM AND NON-TRANSITORY COMPUTER READABLE MEDIUM STORING PROGRAM

(71) Applicant: FUJIFILM Business Innovation Corp., Tokyo (JP)

(72) Inventors: Yuka Sugiyama, Kanagawa (JP); Naoto Yamasaki, Kanagawa (JP); Mari Kodama, Kanagawa (JP); Kimihiko Sasaki, Kanagawa (JP); Bo Liu, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 415 days.

(21) Appl. No.: 18/183,258

(22) Filed: Mar. 14, 2023

(65) Prior Publication Data

US 2024/0078054 A1 Mar. 7, 2024

(30) Foreign Application Priority Data

Sep. 5, 2022 (JP) ................................. 2022-140522

(51) Int. Cl.
G06F 3/12 (2006.01)
(52) U.S. Cl.
CPC .......... G06F 3/1204 (2013.01); G06F 3/1208 (2013.01); G06F 3/1254 (2013.01); G06F 3/1256 (2013.01); G06F 3/1273 (2013.01)
(58) Field of Classification Search
CPC .... G06F 3/1204; G06F 3/1208; G06F 3/1254; G06F 3/1256; G06F 3/1273
USPC ...................................................... 358/1.15
See application file for complete search history.

(56) References Cited

U.S. PATENT DOCUMENTS

| | | | | |
|---|---|---|---|---|
| 7,912,388 B2* | 3/2011 | Toda | .................. | G03G 15/5087 |
| | | | | 399/45 |
| 8,064,079 B2* | 11/2011 | Kimura | ................ | G06Q 20/382 |
| | | | | 709/224 |
| 11,714,587 B2* | 8/2023 | Kaneda | .................... | B41J 29/38 |
| | | | | 358/1.15 |
| 11,789,680 B2* | 10/2023 | Kanamoto | ............ | G06F 3/1275 |
| | | | | 358/1.15 |
| 2003/0098990 A1* | 5/2003 | Nakamura | ............ | G06F 3/1213 |
| | | | | 358/1.14 |
| 2007/0097437 A1* | 5/2007 | Okada | ................ | G03G 15/6508 |
| | | | | 358/1.18 |

(Continued)

FOREIGN PATENT DOCUMENTS

| | | |
|---|---|---|
| JP | 2005-182500 A | 7/2005 |
| JP | 2010-244333 A | 10/2010 |

*Primary Examiner* — Allen H Nguyen
(74) *Attorney, Agent, or Firm* — Oliff PLC

(57) ABSTRACT

An information processing system includes one or more processors configured to: acquire past printing request information on a printing request received in a past, record information on a record of printing performed by a printer based on the past printing request information, and new printing request information on a newly received printing request; and present a candidate for paper to be used for printing related to the new printing request information based on the past printing request information, information included in the record information and related to paper used for the printing, and an attribute of paper to be used as a print medium. The attribute of paper is identified from the new printing request information.

21 Claims, 15 Drawing Sheets

(56)                    References Cited

U.S. PATENT DOCUMENTS

2007/0263242 A1 * 11/2007 Takahashi .......... H04N 1/00413
                                                   358/1.14
2020/0310700 A1 * 10/2020 Nishida ................. G06F 3/1257

* cited by examiner

FIG. 2
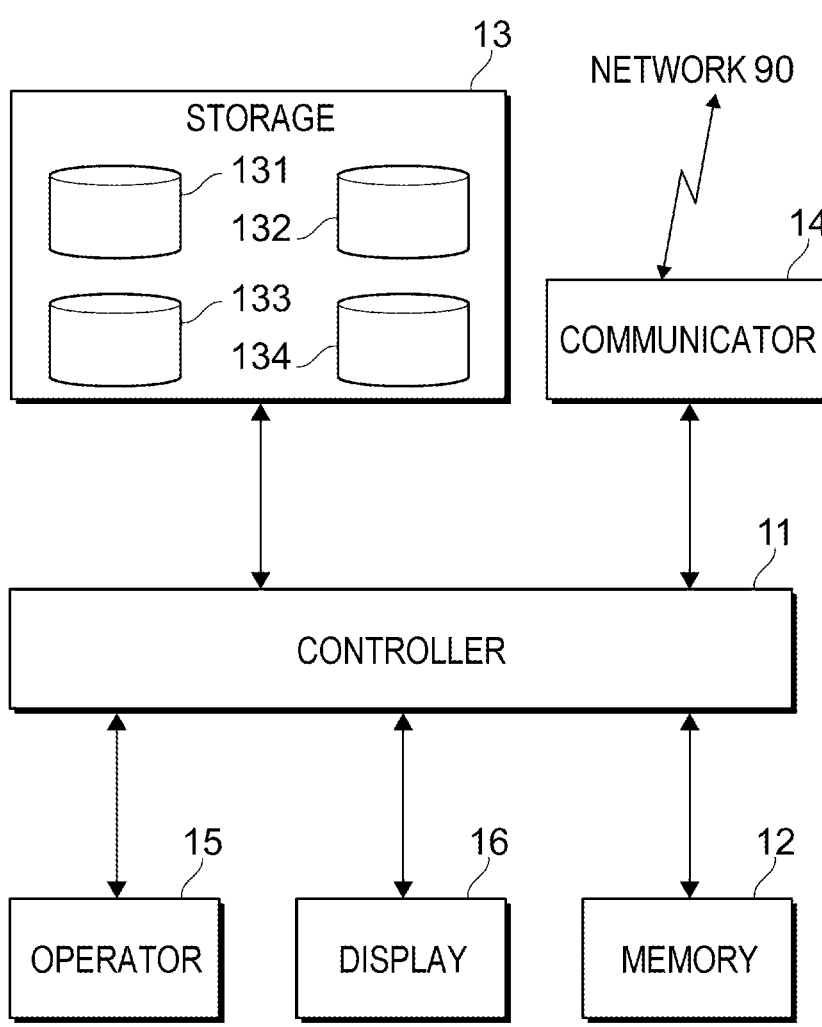

Figure 7:
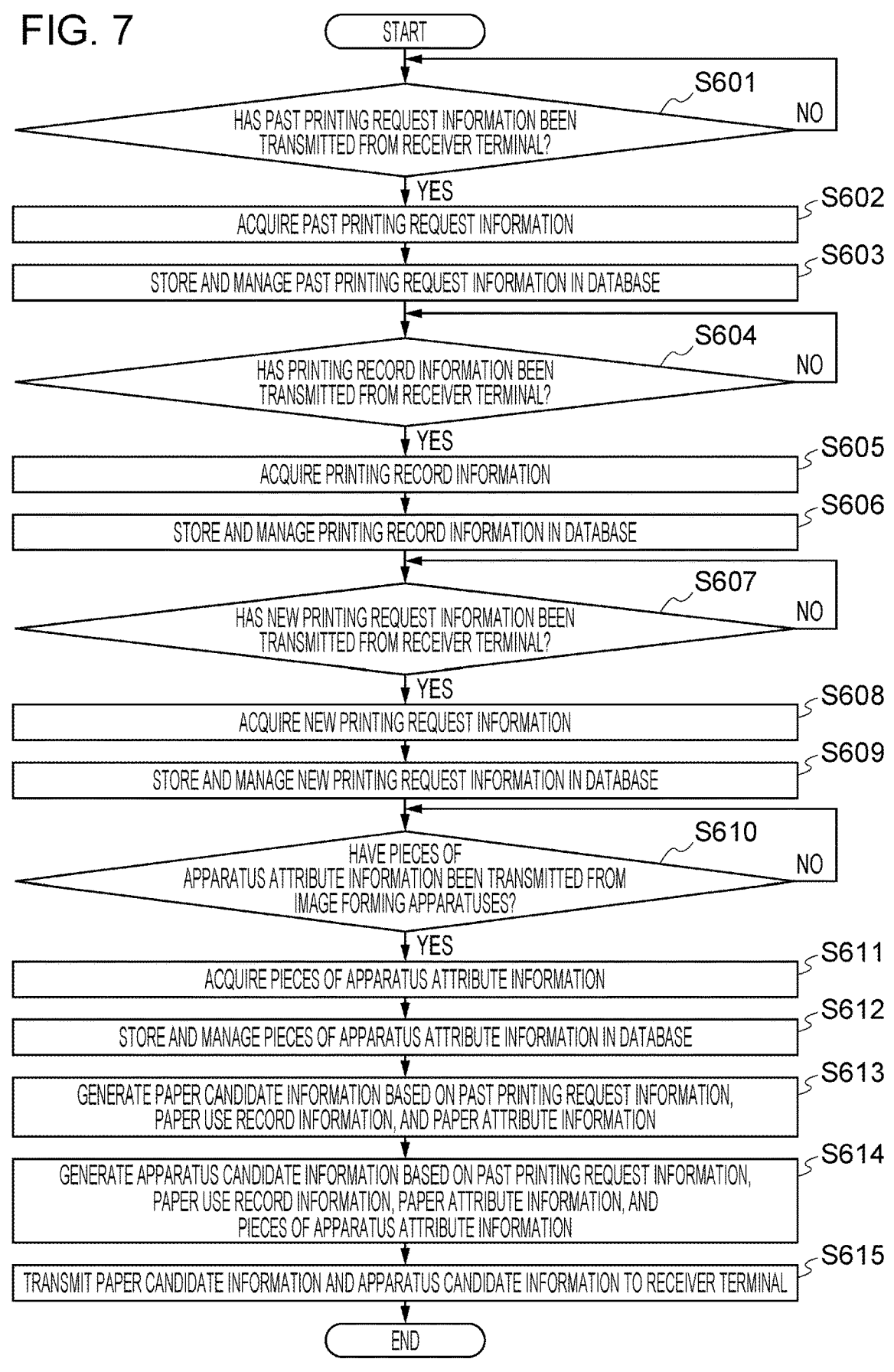

START

S601
HAS PAST PRINTING REQUEST INFORMATION BEEN TRANSMITTED FROM RECEIVER TERMINAL? NO

YES

S602
ACQUIRE PAST PRINTING REQUEST INFORMATION

S603
STORE AND MANAGE PAST PRINTING REQUEST INFORMATION IN DATABASE

S604
HAS PRINTING RECORD INFORMATION BEEN TRANSMITTED FROM RECEIVER TERMINAL? NO

YES

S605
ACQUIRE PRINTING RECORD INFORMATION

S606
STORE AND MANAGE PRINTING RECORD INFORMATION IN DATABASE

S607
HAS NEW PRINTING REQUEST INFORMATION BEEN TRANSMITTED FROM RECEIVER TERMINAL? NO

YES

S608
ACQUIRE NEW PRINTING REQUEST INFORMATION

S609
STORE AND MANAGE NEW PRINTING REQUEST INFORMATION IN DATABASE

S610
HAVE PIECES OF APPARATUS ATTRIBUTE INFORMATION BEEN TRANSMITTED FROM IMAGE FORMING APPARATUSES? NO

YES

S611
ACQUIRE PIECES OF APPARATUS ATTRIBUTE INFORMATION

S612
STORE AND MANAGE PIECES OF APPARATUS ATTRIBUTE INFORMATION IN DATABASE

S613
GENERATE PAPER CANDIDATE INFORMATION BASED ON PAST PRINTING REQUEST INFORMATION, PAPER USE RECORD INFORMATION, AND PAPER ATTRIBUTE INFORMATION

S614
GENERATE APPARATUS CANDIDATE INFORMATION BASED ON PAST PRINTING REQUEST INFORMATION, PAPER USE RECORD INFORMATION, PAPER ATTRIBUTE INFORMATION, AND PIECES OF APPARATUS ATTRIBUTE INFORMATION

S615
TRANSMIT PAPER CANDIDATE INFORMATION AND APPARATUS CANDIDATE INFORMATION TO RECEIVER TERMINAL

END

FIG. 8

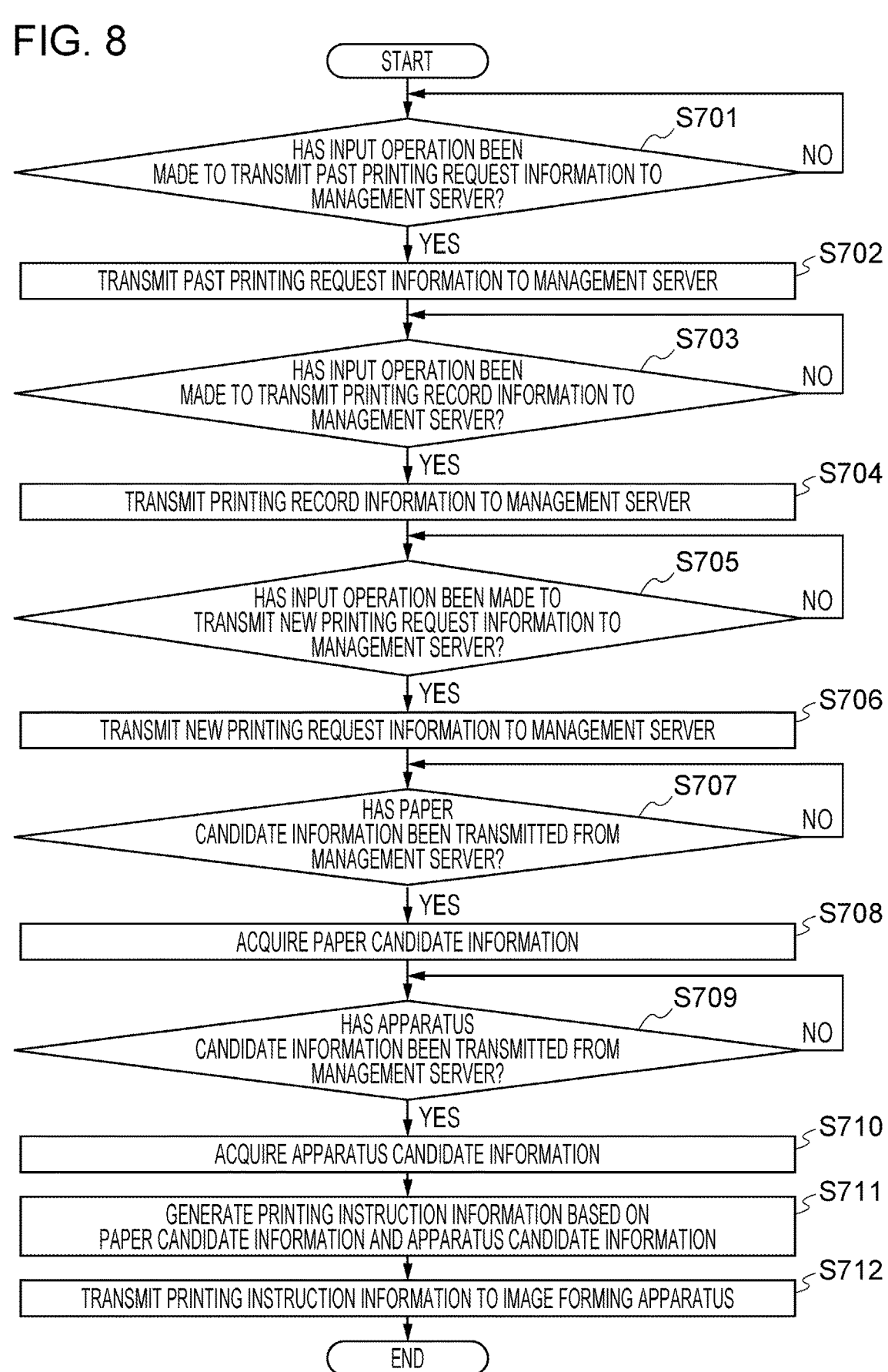

START

S701
HAS INPUT OPERATION BEEN MADE TO TRANSMIT PAST PRINTING REQUEST INFORMATION TO MANAGEMENT SERVER?    NO

YES

S702
TRANSMIT PAST PRINTING REQUEST INFORMATION TO MANAGEMENT SERVER

S703
HAS INPUT OPERATION BEEN MADE TO TRANSMIT PRINTING RECORD INFORMATION TO MANAGEMENT SERVER?    NO

YES

S704
TRANSMIT PRINTING RECORD INFORMATION TO MANAGEMENT SERVER

S705
HAS INPUT OPERATION BEEN MADE TO TRANSMIT NEW PRINTING REQUEST INFORMATION TO MANAGEMENT SERVER?    NO

YES

S706
TRANSMIT NEW PRINTING REQUEST INFORMATION TO MANAGEMENT SERVER

S707
HAS PAPER CANDIDATE INFORMATION BEEN TRANSMITTED FROM MANAGEMENT SERVER?    NO

YES

S708
ACQUIRE PAPER CANDIDATE INFORMATION

S709
HAS APPARATUS CANDIDATE INFORMATION BEEN TRANSMITTED FROM MANAGEMENT SERVER?    NO

YES

S710
ACQUIRE APPARATUS CANDIDATE INFORMATION

S711
GENERATE PRINTING INSTRUCTION INFORMATION BASED ON PAPER CANDIDATE INFORMATION AND APPARATUS CANDIDATE INFORMATION

S712
TRANSMIT PRINTING INSTRUCTION INFORMATION TO IMAGE FORMING APPARATUS

END

FIG. 10

| | | | | PAST PRINTING REQUEST INFORMATION | | | | | |
|---|---|---|---|---|---|---|---|---|---|
| CUSTOMER NAME | PRODUCT ATTRIBUTE | PAPER SIZE | COLOR/ MONOCHROME | BASIS WEIGHT | TEXTURE | NUMBER OF COPIES | UNIT PRICE (CENT) | DELIVERY DATE | PAPER SELECTION | |
| COMPANY A | POSTER | A4 | COLOR | SLIGHTLY THICK | GLOSS | 500 | 5 | 1/13/2022 | HIGH-QUALITY PAPER OF MANUFACTURER AA | ⋮ |
| COMPANY B | MAGAZINE | A2 | COLOR | THIN | GLOSS | 250 | 2 | 2/12/2022 | NONE | |

PRINTING RECORD INFORMATION

| CUSTOMER NAME | PRODUCT ATTRIBUTE | PAPER SIZE | COLOR/ MONOCHROME | BASIS WEIGHT | TEXTURE | NUMBER OF COPIES | UNIT PRICE (CENT) | PAPER TYPE | DELIVERY DATE | ORDER RECEPTION DATE | |
|---|---|---|---|---|---|---|---|---|---|---|---|
| COMPANY A | POSTER | A4 | COLOR | SLIGHTLY THICK | GLOSS | 500 | 5 | HIGH-QUALITY PAPER OF MANUFACTURER AA | 2/1/2022 | 1/13/2022 | ⋮ |
| COMPANY B | MAGAZINE | A2 | COLOR | THIN | GLOSS | 250 | 2 | LARGE-SIZE PAPER OF MANUFACTURER BB | 3/1/2022 | 2/12/2022 | |

| APPARATUS ATTRIBUTE INFORMATION | | | | | |
|---|---|---|---|---|---|
| IMAGE FORMING APPARATUS | QUALITY | SPEED | COLOR/ MONOCHROME | APPLIED PAPER | |
| PRINTER A | HIGH | 150 ppm | COLOR | LARGE-SIZE PAPER OF MANUFACTURER BB | ... |
| PRINTER B | MEDIUM | 100 ppm | MONOCHROME | HIGH-QUALITY PAPER OF MANUFACTURER AA | |

FIG. 13

| PAPER STOCK INFORMATION | | | | | |
|---|---|---|---|---|---|
| PAPER TYPE | TEXTURE | BASIS WEIGHT | PAPER SIZE | PERIOD TO DISCARD | |
| HIGH-QUALITY PAPER OF MANUFACTURER AA | MATTE | SLIGHTLY THICK | A4 | 250 DAYS | ... |
| LARGE-SIZE PAPER OF MANUFACTURER BB | GLOSS | THIN | A3 | 120 DAYS | |

FIG. 14

NEW PRINTING REQUEST INFORMATION

| CUSTOMER NAME | PRODUCT ATTRIBUTE | PAPER SIZE | COLOR/ MONOCHROME | BASIS WEIGHT | TEXTURE | NUMBER OF COPIES | UNIT PRICE (CENT) | DELIVERY DATE | PAPER SELECTION | ⋮ |
|---|---|---|---|---|---|---|---|---|---|---|
| COMPANY C | CALENDAR | B3 | COLOR | SLIGHTLY THICK | MATTE | 400 | 4 | 3/31/2022 | LARGE-SIZE PAPER OF MANUFACTURER CC | |
| COMPANY D | FLYER | A4 | COLOR | THIN | PLAIN | 1000 | 4 | 6/30/2022 | NONE | |

| RANKS OF WEIGHTING | RANK 1 PERIOD TO DELIVERY | RANK 2 QUALITY | | RANK 3 AVERAGE UNIT PRICE PER SHEET |
|---|---|---|---|---|
| | | BASIS WEIGHT (g/m²) | TEXTURE GLOSS/MATTE | |
| UNIT etc. | DAY | | | CENT |
| OVER | 14 | | PLAIN | |
| STANDARD | | 50 | | 1 |
| UNDER | | | PLAIN | |

WEIGHTING CRITERIA

FIG. 16

| CUSTOMER NAME | PRODUCT ATTRIBUTE | PAPER SIZE | COLOR/MONOCHROME | NUMBER OF COPIES | PAPER SELECTION | PAPER NAME | BASIS WEIGHT (g/m²) | TEXTURE | QUALITY | | COST | | DELIVERY | |
|---|---|---|---|---|---|---|---|---|---|---|---|---|---|---|
| | | | | | | | | | FINISHING SELECTION | POST-PROCESSING | COST ESTIMATION | AMOUNT (DOLLAR) | DELIVERY DATE | ORDER RECEPTION DATE |
| COMPANY A | POSTER | A4 | COLOR | 500 | YES | HIGH-QUALITY PAPER OF MANUFACTURER AA | | | HIGH QUALITY | YES | NO | | 2/1/2022 | 1/13/2022 |
| COMPANY B | MAGAZINE | A5 | COLOR | 250 | NO | | 52 | | NONE | NO | YES | 2000 | 3/1/2022 | 2/12/2022 |

| | PATTERN | QUALITY (Q) | COST (C) | DELIVERY (D) |
|---|---|---|---|---|
| 1 | QUALITY, COST, AND DELIVERY ARE "SAME" | SAME | SAME | SAME |
| 2 | DELIVERY IS "DIFFERENT" | SAME | SAME | DIFFERENT |
| 3 | COST IS "DIFFERENT" | SAME | DIFFERENT | SAME |
| 4 | QUALITY IS "DIFFERENT" | DIFFERENT | SAME | SAME |
| 5 | QUALITY AND COST ARE "DIFFERENT" | DIFFERENT | DIFFERENT | SAME |
| 6 | QUALITY AND DELIVERY ARE "DIFFERENT" | DIFFERENT | SAME | DIFFERENT |
| 7 | COST AND DELIVERY ARE "DIFFERENT" | SAME | DIFFERENT | DIFFERENT |
| 8 | QUALITY, COST, AND DELIVERY ARE "DIFFERENT" | DIFFERENT | DIFFERENT | DIFFERENT |

INFORMATION PROCESSING SYSTEM AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2022-140522 filed Sep. 5, 2022.

BACKGROUND

(i) Technical Field

The present disclosure relates to an information processing system and a non-transitory computer readable medium storing a program.

(ii) Related Art

In the field of printing, there is known a technology for proposing, to a user of printing, the types and product numbers of print paper by referring to paper information such as characteristics and costs for the individual types and product numbers of paper (e.g., Japanese Unexamined Patent Application Publication No. 2010-244333).

SUMMARY

Aspects of non-limiting embodiments of the present disclosure relate to the following circumstances. In this technology, the user selects paper suited to printing from among paper candidates satisfying conditions. Therefore, the user may have a burden and the efficiency may decrease depending on the number of paper candidates. Further, the paper selection depends on the user's experience and ability, and therefore the efficiency may decrease depending on the user.

Aspects of non-limiting embodiments of the present disclosure therefore relate to improvement in the user's paper selection efficiency compared with a case where the user selects paper from among all the paper candidates satisfying conditions set when a printing request is made in printing work.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system comprising one or more processors configured to: acquire past printing request information on a printing request received in a past, record information on a record of printing performed by a printer based on the past printing request information, and new printing request information on a newly received printing request; and present a candidate for paper to be used for printing related to the new printing request information based on the past printing request information, information included in the record information and related to paper used for the printing, and an attribute of paper to be used as a print medium, the attribute of paper being identified from the new printing request information.

BRIEF DESCRIPTION OF THE DRAWINGS

An exemplary embodiment of the present disclosure will be described in detail based on the following figures, wherein:

FIG. 2 illustrates an example of the hardware configuration of a management server;

FIG. 7 is a flowchart illustrating an example of a processing flow of the management server;

FIG. 8 is a flowchart illustrating an example of a processing flow of the receiver terminal;

FIG. 10 illustrates a specific example of past printing request information stored in a database;

FIG. 11 illustrates a specific example of printing record information stored in a database;

FIG. 12 illustrates a specific example of apparatus attribute information stored in a database;

FIG. 13 illustrates a specific example of paper stock information stored in a database;

FIG. 14 illustrates a specific example of new printing request information stored in a database;

FIG. 15 illustrates a specific example of weighting criteria;

FIG. 16 illustrates a specific example of paper candidate information; and

FIG. 17 illustrates a list of patterns to be used for extracting candidates for paper to be used for printing and indicating whether elements are the same or different between the new printing request information and the printing record information.

DETAILED DESCRIPTION

An exemplary embodiment of the present disclosure is described in detail with reference to the accompanying drawings.

(Configuration of Information Processing System)

Figure 1:
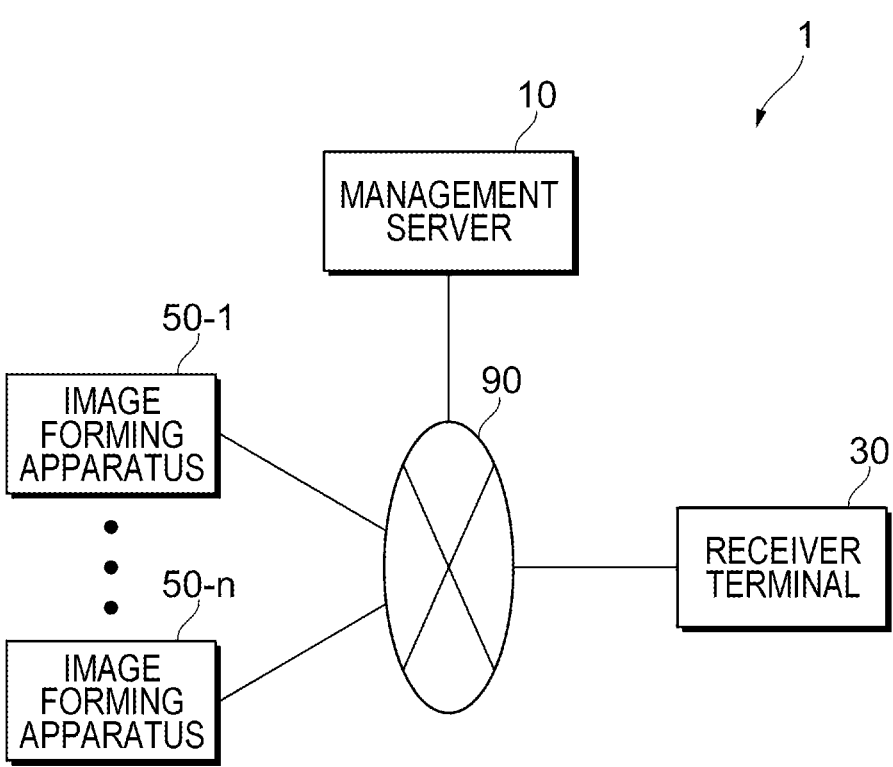
FIG. 1 illustrates an example of the overall configuration of an information processing system according to an exemplary embodiment.

FIG. 1 illustrates an example of the overall configuration of an information processing system 1 according to this exemplary embodiment.

The information processing system 1 includes a management server 10, a receiver terminal 30, and image forming apparatuses 50-1 to 50-n (n is an integer of 2 or more) that are connected via a network 90. Examples of the network 90 include a local area network (LAN) and the Internet. The image forming apparatuses 50-1 to 50-n may be referred to collectively as "image forming apparatuses 50" unless otherwise distinguished.

The management server 10 is an information processing apparatus serving as a server that manages the entire information processing system 1. The management server 10 acquires information on printing requests received in the past by the receiver terminal 30 (hereinafter referred to as "past printing request information"), and information on records of printing performed by the image forming apparatus 50 based on the past printing request information (hereinafter referred to as "printing record information"). The management server 10 acquires information on a printing request newly received by the receiver terminal 30 (hereinafter referred to as "new printing request information"). The management server 10 acquires information on an attribute of the image forming apparatus 50 (hereinafter referred to as "apparatus attribute information"). The apparatus attribute information includes, for example, information on the performance of the image forming apparatus 50 and paper already set in the image forming apparatus 50.

The management server 10 generates information on candidates of paper to be used for printing related to the new printing request information (hereinafter referred to as "paper candidate information") based on the acquired past printing request information, information included in the printing record information and related to paper serving as a print medium used in printing (hereinafter referred to as "paper use record information"), and information included in the new printing request information and related to an attribute of paper to be used as the print medium (hereinafter referred to as "paper attribute information"). The paper attribute information includes, for example, information on a paper size, a basis weight (weight of paper per 1 m² (square meter) or thickness of paper), and a texture (paper texture for users).

The management server 10 generates information on candidates of an image forming apparatus 50 that may respond to the new printing request information (hereinafter referred to as "apparatus candidate information") based on the acquired apparatus attribute information. The management server 10 transmits the generated paper candidate information and the generated apparatus candidate information to the receiver terminal 30. Details of processes performed by the management server 10 are described later.

The receiver terminal 30 is an information processing apparatus that receives new printing request information from outside (e.g., a customer) or inside (e.g., a company employee) and gives a printing instruction to the image forming apparatus 50 based on the new printing request information. The receiver terminal 30 transmits the new printing request information and printing record information to the management server 10 before the printing instruction is given to the image forming apparatus 50. In response to transmission of paper candidate information and apparatus candidate information from the management server 10, the receiver terminal 30 generates information on a printing instruction for the image forming apparatus 50 (hereinafter referred to as "printing instruction information") based on the paper candidate information and the apparatus candidate information, and transmits the printing instruction information to the image forming apparatus 50. In this exemplary embodiment, a person who operates the receiver terminal 30 to perform printing based on the new printing request information is referred to as "receiver". Details of processes performed by the receiver terminal 30 are described later.

The image forming apparatus 50 is an information processing apparatus that performs printing based on a printing instruction from the receiver terminal 30. The image forming apparatus 50 is also an image output apparatus that outputs a recording medium on which an image is formed. For example, in response to transmission of printing instruction information from the receiver terminal 30, the image forming apparatus 50 forms a printing target image on paper based on details of the printing instruction information. The image forming apparatus 50 transmits its apparatus attribute information to the management server 10. Examples of the image forming apparatus 50 include a so-called electrophotographic multifunction peripheral that forms a toner image on a print surface of paper, and a so-called inkjet printer that ejects ink to a print surface of paper. Details of processes performed by the image forming apparatus 50 are described later.

The configuration of the information processing system 1 is an example as long as the information processing system 1 as a whole has functions to implement the processes described above. Therefore, a part or all of the functions to implement the processes may be performed separately or cooperatively in the information processing system 1. That is, a part or all of the functions of the management server 10 may be set as functions of the receiver terminal 30 or the image forming apparatus 50, and a part or all of the functions of the receiver terminal 30 may be set as functions of the management server 10 or the image forming apparatus 50. A part or all of the functions of the image forming apparatus 50 may be set as functions of the management server 10 or the receiver terminal 30. Further, a part or all of the functions of the management server 10, the receiver terminal 30, and the image forming apparatus 50 of the information processing system 1 may be transferred to any other server or the like (not illustrated).

(Hardware Configuration of Management Server)

FIG. 2 illustrates an example of the hardware configuration of the management server 10.

The management server 10 includes a controller 11, a memory 12, a storage 13, a communicator 14, an operator 15, and a display 16. Those components are connected by a data bus, an address bus, or a peripheral component interconnect (PCI) bus.

The controller 11 is a processor that controls the functions of the management server 10 through execution of various types of software such as an OS (basic software) and application software (applied software). The controller 11 includes, for example, a central processing unit (CPU). The memory 12 is a storage area that stores various types of software and data to be used for execution of the software, and is used as a working area for computation. The memory 12 includes, for example, a random access memory (RAM).

The storage 13 is a storage area that stores data input to and output from various types of software. The storage 13 includes, for example, a hard disk drive (HDD), a solid state drive (SSD), or a semiconductor memory to be used for storing programs and various types of setting data. For example, the storage 13 stores, as databases that store various types of information, a request record DB 131 that stores past printing request information and new printing request information, a printing record DB 132 that stores printing record information, an apparatus DB 133 that stores apparatus attribute information, and a paper stock DB 134 that stores information on a stock of paper of the receiver (hereinafter referred to as "paper stock information").

The communicator 14 transmits data to and receives data from the receiver terminal 30 and the outside via the network 90. The operator 15 includes, for example, a keyboard, a mouse, mechanical buttons, and switches, and receives input operations. The operator 15 also includes a touch sensor constituting a touch panel together with the display 16. Examples of the display 16 include a liquid crystal display and an organic electroluminescence (EL) display to be used for displaying information. The display 16 displays image and text data.

(Hardware Configuration of Receiver Terminal)

The hardware configuration of the receiver terminal 30 is similar to the hardware configuration of the management server 10 illustrated in FIG. 2. That is, the receiver terminal 30 includes a controller, a memory, a storage, a communicator, an operator, and a display having functions similar to those of the controller 11, the memory 12, the storage 13, the communicator 14, the operator 15, and the display 16 of FIG. 2, respectively. Illustration and description thereof are omitted.

(Hardware Configuration of Image Forming Apparatus)

Figure 3:
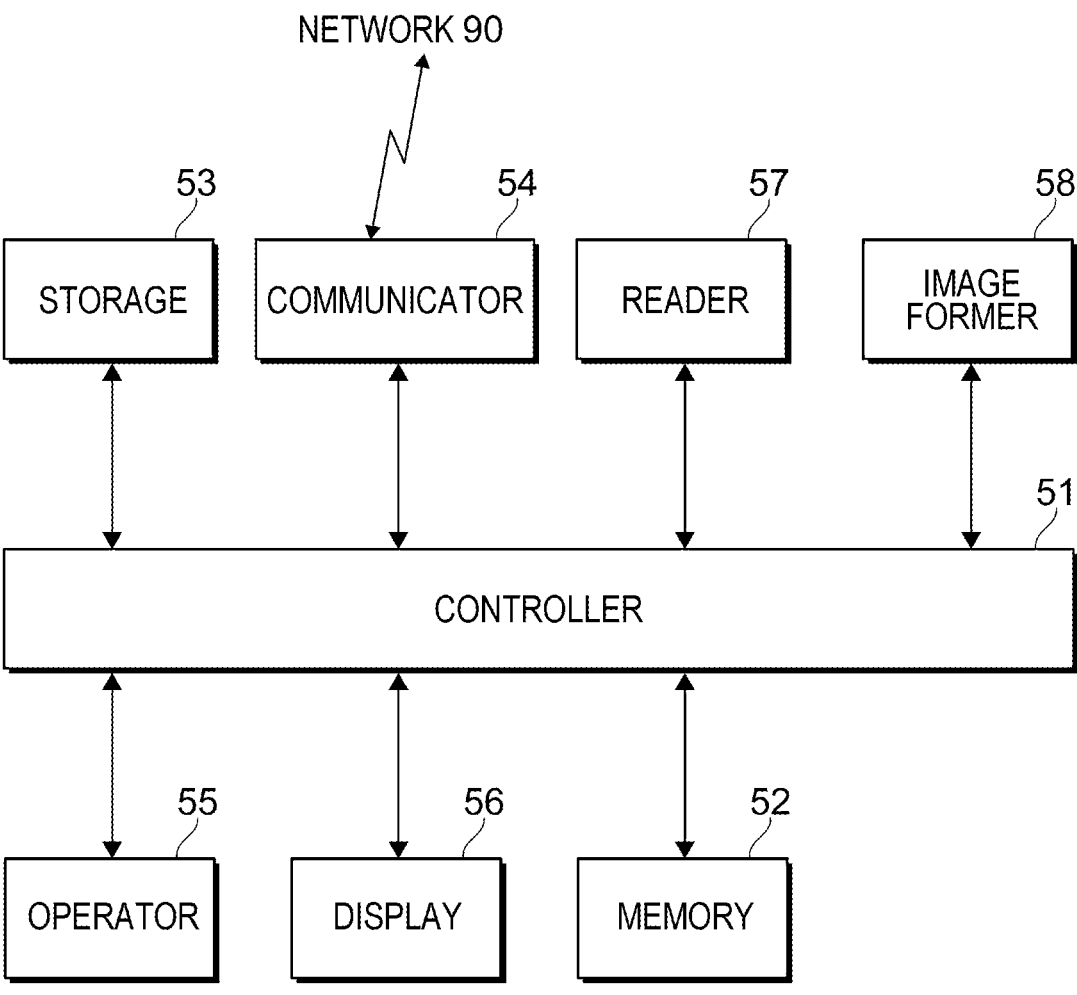
FIG. 3 illustrates an example of the hardware configuration of an image forming apparatus.

FIG. 3 illustrates an example of the hardware configuration of the image forming apparatus 50.

The image forming apparatus 50 has a hardware configuration corresponding to the hardware configuration of the management server 10 of FIG. 2 in terms of the controller 11, the memory 12, the storage 13, the communicator 14, the operator 15, and the display 16.

That is, the image forming apparatus 50 includes a controller 51 that is a processor such as a CPU, a memory 52 that is a storage area such as a RAM, and a storage 53 that is a storage area such as an HDD, an SDD, or a semiconductor memory. The storage 53 stores databases that store various types of information. The image forming apparatus 50 includes a communicator 54 that transmits data to and receives data from the management server 10, the receiver terminal 30, and the outside via the network 90. The image forming apparatus 50 includes an operator 55 that is a touch panel or the like, and a display 56 that is a liquid crystal display, an organic EL display, or the like.

In addition to those components, the image forming apparatus 50 includes a reader 57 and an image former 58. The reader 57 reads an image recorded on a recording medium such as paper (e.g., a document on a paper medium). Examples of the reader 57 include a charge coupled device (CCD) scanner configured such that light radiated from a light source and reflected on a document is reduced by lenses and received by CCDs, and a contact image sensor (CIS) scanner configured such that light radiated sequentially from an LED light source and reflected on a document is received by a CIS. The image former 58 forms a printing target image on a print surface of paper serving as a recording medium by, for example, an electrophotographic or inkjet system. Those components are connected by a data bus, an address bus, or a PCI bus.

(Functional Configuration of Controller of Management Server)

Figure 4:
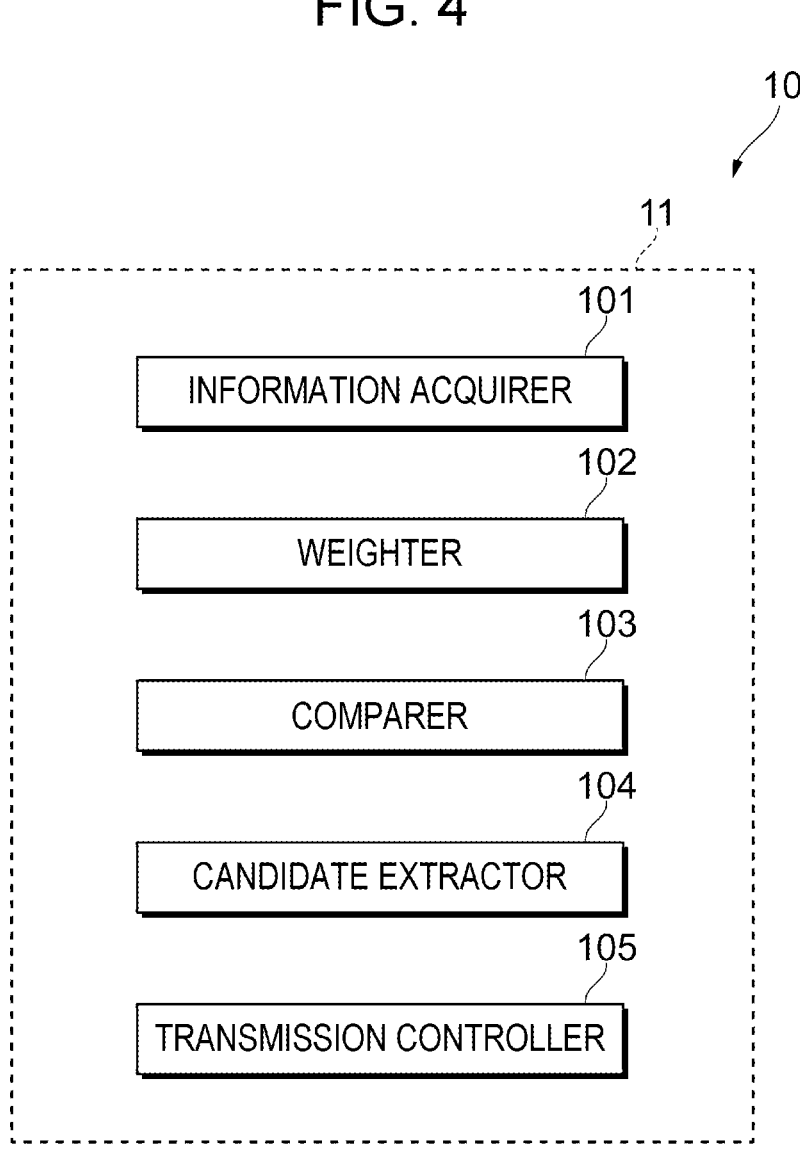
FIG. 4 illustrates an example of the functional configuration of a controller of the management server.

FIG. 4 illustrates an example of the functional configuration of the controller 11 of the management server 10.

In the controller 11 of the management server 10, an information acquirer 101, a weighter 102, a comparer 103, a candidate extractor 104, and a transmission controller 105 exert their functions.

The information acquirer 101 acquires various types of information. Specifically, the information acquirer 101 acquires pieces of information transmitted from the receiver terminal 30, the image forming apparatus 50, and the outside. Examples of the information to be transmitted from the receiver terminal 30 and acquired by the information acquirer 101 include past printing request information, printing record information, new printing request information, and paper stock information. Examples of the information to be transmitted from the image forming apparatus 50 and acquired by the information acquirer 101 include apparatus attribute information of the image forming apparatus 50.

The past printing request information and the new printing request information acquired by the information acquirer 101 are stored and managed in the request record DB 131 of the storage 13 (see FIG. 2). The acquired printing record information is stored and managed in the printing record DB 132 of the storage 13. The acquired apparatus attribute information is stored and managed in the apparatus DB 133 of the storage 13. The acquired paper stock information is stored and managed in the paper stock DB 134 of the storage 13.

The weighter 102 weights a plurality of elements related to printing in accordance with predetermined criteria. Examples of the plurality of elements related to the printing include quality, cost, and delivery that are set in advance. In this case, the weighter 102 weights the quality, the cost, and the delivery related to the printing based on the printing record information and the new printing request information. A specific example of the weighting criteria is described later with reference to FIG. 15.

The comparer 103 compares a combination of a requester of a newly received printing request and an attribute of paper to be used for printing based on the printing request with a combination of a requester of a printing request received in the past and an attribute of paper used for printing based on the printing request. Specifically, the comparer 103 compares a combination of a requester of a new request and paper attribute information that are identified from the new printing request information with a combination of a requester of a past request and paper attribute information that are identified from the past printing request information and the printing record information.

The candidate extractor 104 extracts candidates for paper to be used for printing based on the past printing request information acquired by the information acquirer 101, paper use record information in the printing record information, and paper attribute information identified from the new printing request information. For example, the candidate extractor 104 extracts candidates for paper to be used for new printing based on a combination of a requester of a printing request received in the past and paper used for past printing, and a combination of a receiver of a newly received printing request and paper to be used for the new printing. The requester of the printing request received in the past is identified from the past printing request information. The paper used for the past printing is identified from the printing record information. The receiver of the newly received printing request and the paper to be used for the printing are identified from the new printing request information.

The candidate extractor 104 extracts candidates for paper to be used for new printing based on the plurality of elements related to the printing that are identified from the new printing request information. Examples of the "plurality of elements related to printing" include quality, cost, and delivery related to the printing. If the weighter 102 has weighted the plurality of elements related to the printing, the candidate extractor 104 extracts the candidates for the paper to be used for the new printing based on a result of the weighting. The candidate extractor 104 extracts the candidates for the paper to be used for the new printing based on possessing periods for individual types or brands of paper possessed by the receiver as a stock. The possessing period is identified from the paper stock information.

If the result of the weighting by the weighter 102 shows that the cost is weighted among the plurality of elements related to the printing, the candidate extractor 104 extracts candidates for paper expected to shorten the paper possessing periods and reduce the requested price of the printing request. Specifically, the candidate extractor 104 extracts the candidates for the paper to be used for the new printing based on apparatus attribute information of an image forming apparatus 50 that has performed printing based on the printing request received in the past, and apparatus attribute information of an image forming apparatus 50 expected to perform printing based on the newly received printing request.

The apparatus attribute information of the image forming apparatus 50 that has performed the printing based on the printing request received in the past includes, for example, specifications, a price, and a printing speed for each brand of paper used in the printing. The apparatus attribute information of the image forming apparatus 50 expected to perform the printing based on the newly received printing request includes, for example, specifications, a price, and a printing speed for each brand of paper available in the printing. The apparatus attribute information of the image forming apparatus 50 that has performed the printing based on the printing request received in the past is identified from the printing record information. The apparatus attribute information of the image forming apparatus 50 expected to perform the printing based on the newly received printing request is identified from the new printing request information.

If the result of the weighting by the weighter 102 shows that the delivery is weighted among the plurality of elements related to the printing, the candidate extractor 104 extracts candidates for an image forming apparatus 50 expected to complete the delivery in time and candidates for paper printable by the image forming apparatus 50. Specifically, the candidate extractor 104 extracts candidate for the image forming apparatus 50 and candidates for paper based on the apparatus attribute information of the image forming apparatus 50 that has performed the printing based on the printing request received in the past, the apparatus attribute information of the image forming apparatus 50 expected to perform the printing based on the newly received printing request, and a delivery date. The apparatus attribute information of the image forming apparatus 50 that has performed the printing based on the printing request received in the past is identified from the printing record information. The apparatus attribute information of the image forming apparatus 50 expected to perform the printing based on the newly received printing request and the delivery date are identified from the new printing request information.

If the result of the weighting by the weighter 102 shows that the quality is weighted among the plurality of elements related to the printing, the candidate extractor 104 extracts candidate for an image forming apparatus 50 expected to obtain a printing result satisfying a predetermined quality and candidates for paper printable by the image forming apparatus 50 based on the apparatus attribute information of the image forming apparatus 50 that has performed the printing based on the printing request received in the past, and the apparatus attribute information of the image forming apparatus 50 expected to perform the printing based on the newly received printing request. The apparatus attribute information of the image forming apparatus 50 that has performed the printing based on the printing request received in the past is identified from the printing record information. The apparatus attribute information of the image forming apparatus 50 expected to perform the printing based on the newly received printing request is identified from the new printing request information.

If the result of the comparison by the comparer 103 shows determination that the combination of the requester of the newly received printing request and the attribute of the paper to be used for the printing based on the printing request is similar to the combination of the requester of the printing request received in the past and the attribute of the paper used for the printing based on the printing request, the candidate extractor 104 extracts candidates for the paper to be used for the new printing based on a difference in the elements between the new printing request information and the printing record information corresponding to each other. For example, the candidate extractor 104 extracts candidates for the paper to be used for the new printing based on a difference in one or more elements out of the quality, the cost, and the delivery related to the printing based on the printing request as the "difference in elements". In this case, the candidate extractor 104 extracts candidates for the paper to be used for the new printing based on a result of the weighting by the weighter 102 for the difference in the quality, the cost, and the delivery.

For example, if the quality requested by the requester identified from the new printing request information is higher than the quality identified from the printing record information, the candidate extractor 104 extracts candidates for the paper to be used for the new printing based on a weighting result showing that the quality is weighted. If the quality requested by the requester identified from the new printing request information is lower than the quality identified from the printing record information, the candidate extractor 104 extracts candidates for the paper to be used for the new printing based on a weighting result showing that the cost is weighted.

Description is made about, for example, the weighting based on the difference in the cost as the "difference in elements". If the requested price identified from the new printing request information is higher than the requested price identified from the printing record information, the candidate extractor 104 extracts candidates for the paper to be used for the new printing based on a weighting result showing that the quality is weighted. If the requested price identified from the new printing request information is lower than the requested price identified from the printing record information, the candidate extractor 104 extracts candidates for the paper to be used for the new printing based on a weighting result showing that the cost is weighted.

Description is made about, for example, the weighting based on the difference in the delivery as the "difference in elements". If the period to the delivery date requested by the requester identified from the new printing request information is shorter than the period to the delivery date identified from the printing record information, the candidate extractor 104 extracts candidates for the paper to be used for the new printing based on a weighting result showing that the delivery is weighted. If the period to the delivery date requested by the requester identified from the new printing request information is longer than the period to the delivery date identified from the printing record information, the candidate extractor 104 extracts candidates for the paper to be used for the new printing based on a weighting result showing that the quality is weighted.

The transmission controller 105 controls transmission of various types of information. Specifically, the transmission controller 105 controls transmission of various types of information to the receiver terminal 30, the image forming apparatus 50, and the outside. Examples of the information to be transmitted to the receiver terminal 30 under the control of the transmission controller 105 include paper candidate information and apparatus candidate information.

(Functional Configuration of Controller of Receiver Terminal)

Figure 5:
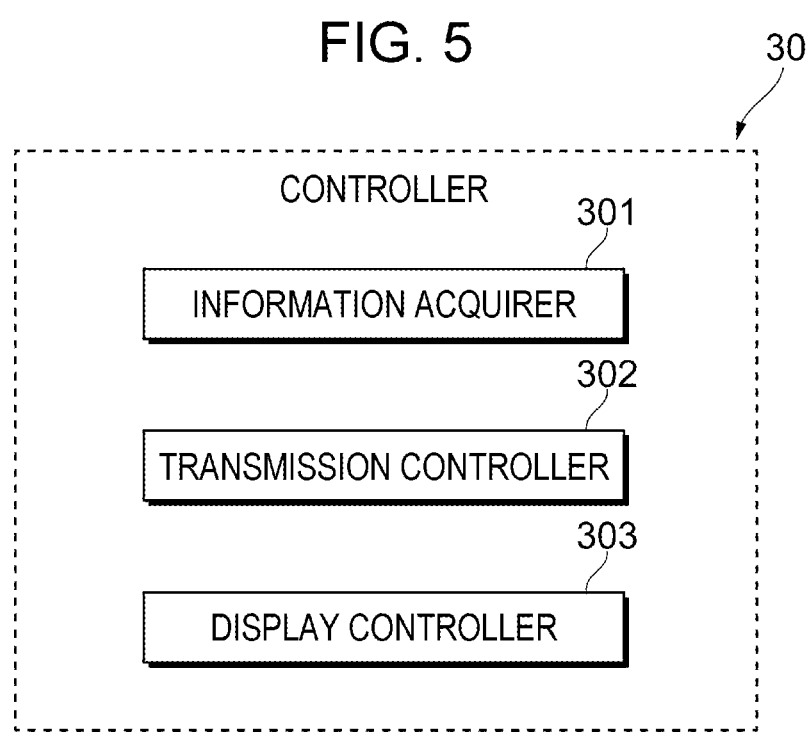
FIG. 5 illustrates an example of the functional configuration of a controller of a receiver terminal.

FIG. 5 illustrates an example of the functional configuration of the controller of the receiver terminal 30.

In the controller of the receiver terminal 30, an information acquirer 301, a transmission controller 302, and a display controller 303 exert their functions.

The information acquirer 301 acquires various types of information. Specifically, the information acquirer 301 acquires pieces of information transmitted from the management server 10, the image forming apparatus 50, and the outside. Examples of the information to be transmitted from the management server 10 and acquired by the information acquirer 301 include paper candidate information and apparatus candidate information.

The information acquirer 301 acquires information input via the operator. Examples of the information to be input via the operator include information input to transmit past printing request information, printing record information, new printing request information, and paper stock information to the management server 10. The printing record information is acquired from the image forming apparatus 50.

The transmission controller 302 controls transmission of various types of information. Specifically, the transmission controller 302 controls transmission of various types of information to the management server 10, the image forming apparatus 50, and the outside. Examples of the information to be transmitted to the management server 10 under the control of the transmission controller 302 include past printing request information, printing record information, and new printing request information. Examples of the information to be transmitted to the image forming apparatus 50 under the control of the transmission controller 302 include printing instruction information.

The display controller 303 controls the display to display various types of information. Specifically, the display controller 303 controls the display to display pieces of information transmitted from the management server 10 and each image forming apparatus 50. Examples of the information to be displayed on the display under the control of the display controller 303 include paper candidate information, apparatus candidate information, and printing record information.

(Functional Configuration of Controller of Image Forming Apparatus)

Figure 6:
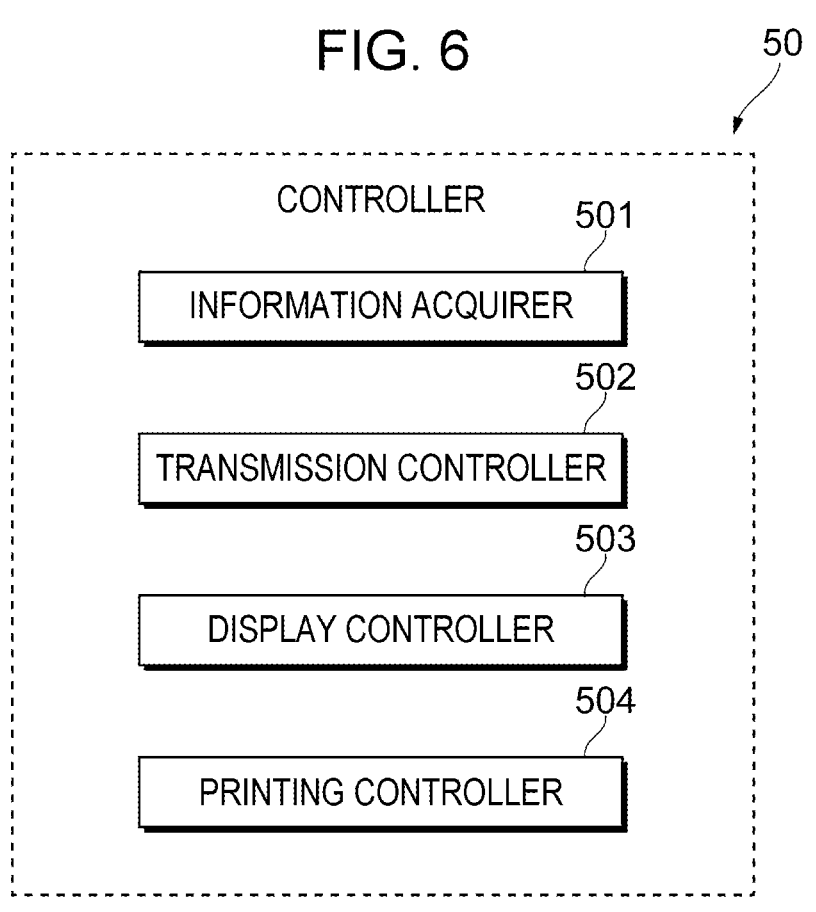
FIG. 6 illustrates an example of the functional configuration of a controller of the image forming apparatus.

FIG. 6 illustrates an example of the functional configuration of the controller 51 of the image forming apparatus 50.

In the controller 51 of the image forming apparatus 50, an information acquirer 501, a transmission controller 502, a display controller 503, and a printing controller 504 exert their functions.

The information acquirer 501 acquires various types of information. Specifically, the information acquirer 501 acquires pieces of information transmitted from the management server 10, the image forming apparatus 50, and the outside. Examples of the information to be transmitted from the receiver terminal 30 and acquired by the information acquirer 501 include printing instruction information. The information acquirer 501 acquires information input via the operator. Examples of the information to be input via the operator include information input to start printing.

The transmission controller 502 controls transmission of various types of information. Specifically, the transmission controller 502 controls transmission of various types of information to the management server 10, the receiver terminal 30, and the outside. Examples of the information to be transmitted to the management server 10 under the control of the transmission controller 502 include apparatus attribute information. The timing to transmit the apparatus attribute information is not particularly limited. For example, the apparatus attribute information may be transmitted at predetermined time intervals (e.g., intervals of 3 hours, 6 hours, or 12 hours) or in response to an inquiry from the management server 10. Examples of the information to be transmitted to the receiver terminal 30 under the control of the transmission controller 502 include printing record information.

The display controller 503 controls the display to display various types of information. Specifically, the display controller 503 controls the display to display pieces of information transmitted from the management server 10 and the receiver terminal 30. Examples of the information to be displayed on the display under the control of the display controller 503 include printing instruction information.

The printing controller 504 controls the image former 58 (see FIG. 3) to print a printing target image based on printing instruction information transmitted from the receiver terminal 30.

(Processing Flow of Management Server)

FIG. 7 is a flowchart illustrating an example of a processing flow of the management server 10.

If past printing request information has been transmitted from the receiver terminal 30 ("YES" in Step 601), the management server 10 acquires the transmitted past printing request information (Step 602), and stores and manages the acquired past printing request information in the database (e.g., the request record DB 131 of FIG. 2) (Step 603). If no past printing request information has been transmitted ("NO" in Step 601), the management server 10 repeats Step 601 until past printing request information is transmitted.

If printing record information has been transmitted from the receiver terminal 30 ("YES" in Step 604), the management server 10 acquires the transmitted printing record information (Step 605), and stores and manages the acquired printing record information in the database (e.g., the printing record DB 132 of FIG. 2) (Step 606). If no printing record information has been transmitted ("NO" in Step 604), the management server 10 repeats Step 604 until printing record information is transmitted.

If new printing request information has been transmitted from the receiver terminal 30 ("YES" in Step 607), the management server 10 acquires the transmitted new printing request information (Step 608), and stores and manages the acquired new printing request information in the database (e.g., the request record DB 131 of FIG. 2) (Step 609). If no new printing request information has been transmitted ("NO" in Step 607), the management server 10 repeats Step 607 until new printing request information is transmitted.

If pieces of apparatus attribute information have been transmitted from the image forming apparatuses 50 ("YES" in Step 610), the management server 10 acquires the transmitted pieces of apparatus attribute information (Step 611), and stores and manages the acquired pieces of apparatus attribute information in the database (e.g., the apparatus DB 133 of FIG. 2) (Step 612). If no apparatus attribute information has been transmitted ("NO" in Step 610), the management server 10 repeats Step 610 until pieces of apparatus attribute information are transmitted.

The management server 10 generates paper candidate information based on the past printing request information acquired in Step 602, paper use record information in the printing record information acquired in Step 605, and paper attribute information in the new printing request information acquired in Step 608 (Step 613). Next, the management server 10 generates apparatus candidate information based on the past printing request information, the paper use record information, the paper attribute information, and the pieces of apparatus attribute information acquired in Step 611 (Step 614). Next, the management server 10 transmits the paper candidate information generated in Step 613 and the apparatus candidate information generated in Step 614 to the receiver terminal 30 (Step 615).

(Processing Flow of Receiver Terminal)

FIG. 8 is a flowchart illustrating an example of a processing flow of the receiver terminal 30.

If an input operation has been made to transmit past printing request information to the management server 10 ("YES" in Step 701), the receiver terminal 30 transmits the past printing request information to the management server 10 (Step 702). If the input operation has not been made to transmit the past printing request information ("NO" in Step 701), the receiver terminal 30 repeats Step 701 until the input operation is made to transmit the past printing request information.

If an input operation has been made to transmit printing record information to the management server 10 ("YES" in Step 703), the receiver terminal 30 transmits the printing record information to the management server 10 (Step 704). If the input operation has not been made to transmit the printing record information ("NO" in Step 703), the receiver terminal 30 repeats Step 703 until the input operation is made to transmit the printing record information.

If an input operation has been made to transmit new printing request information to the management server 10 ("YES" in Step 705), the receiver terminal 30 transmits the new printing request information to the management server 10 (Step 706). If the input operation has not been made to transmit the new printing request information ("NO" in Step 705), the receiver terminal 30 repeats Step 705 until the input operation is made to transmit the new printing request information.

If paper candidate information has been transmitted from the management server 10 ("YES" in Step 707), the receiver terminal 30 acquires the transmitted paper candidate information (Step 708). If no paper candidate information has been transmitted ("NO" in Step 707), the receiver terminal 30 repeats Step 707 until paper candidate information is transmitted. If apparatus candidate information has been transmitted from the management server 10 ("YES" in Step 709), the receiver terminal 30 acquires the transmitted apparatus candidate information (Step 710). If no apparatus candidate information has been transmitted ("NO" in Step 709), the receiver terminal 30 repeats Step 709 until apparatus candidate information is transmitted. Next, the receiver terminal 30 generates printing instruction information based on the paper candidate information acquired in Step 708 and the apparatus candidate information acquired in Step 710 (Step 711), and transmits the generated printing instruction information to the image forming apparatus 50 (Step 712).

(Processing Flow of Image Forming Apparatus)

Figure 9:
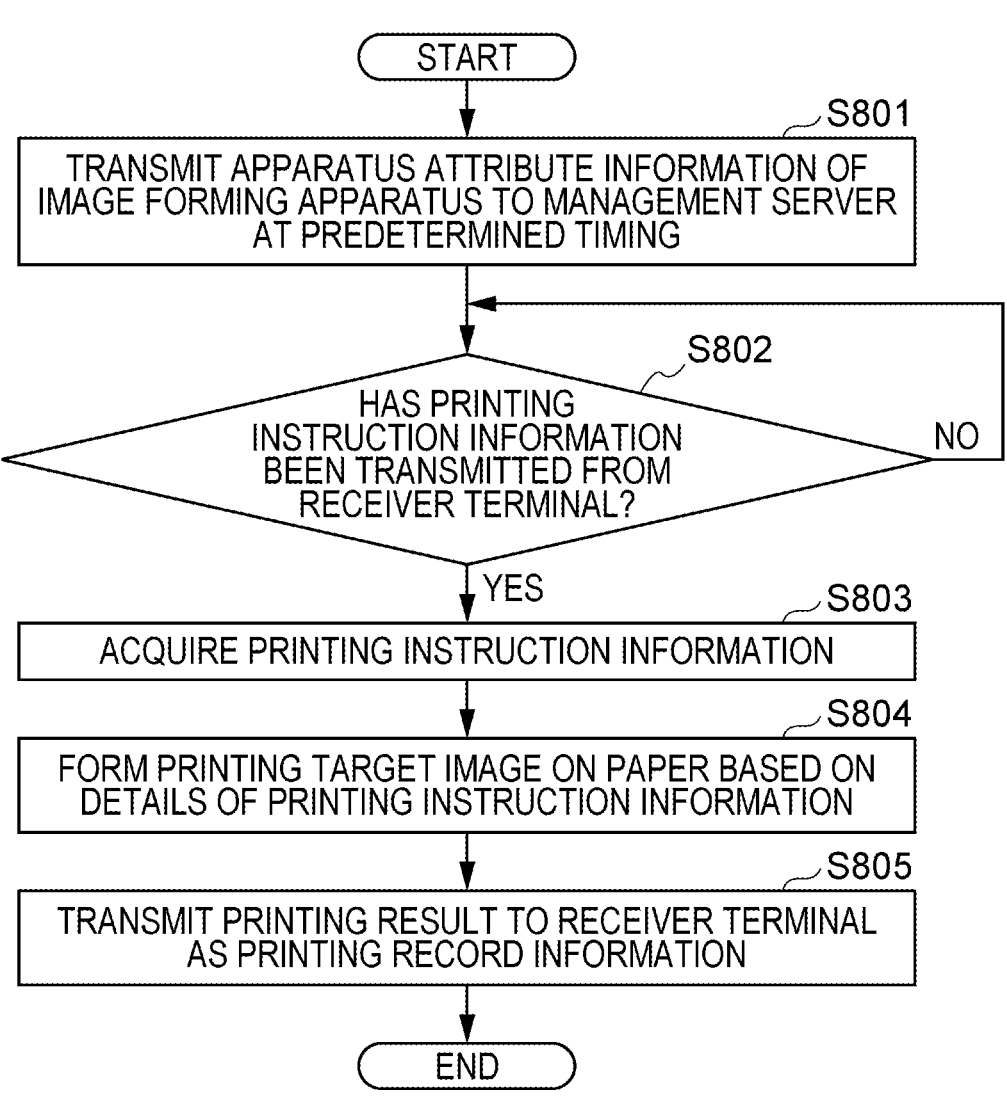
FIG. 9 is a flowchart illustrating an example of a processing flow of the image forming apparatus.

FIG. 9 is a flowchart illustrating an example of a processing flow of the image forming apparatus 50.

The image forming apparatus 50 transmits its apparatus attribute information to the management server 10 at a predetermined timing (Step 801). If printing instruction information has been transmitted from the receiver terminal 30 ("YES" in Step 802), the image forming apparatus 50 acquires the transmitted printing instruction information (Step 803). If no printing instruction information has been transmitted ("NO" in Step 802), the image forming apparatus 50 repeats Step 802 until printing instruction information is transmitted.

The image forming apparatus 50 forms a printing target image on paper based on details of the printing instruction information acquired in Step 803 (Step 804), and transmits a printing result to the receiver terminal 30 as printing record information (Step 805).

(Specific Examples)

FIG. 10 illustrates a specific example of the past printing request information stored in the database.

As illustrated in FIG. 10, the past printing request information includes information on "customer name", "product attribute", "paper size", "color/monochrome", "basis weight", "texture", "number of copies", "unit price (cent)", "delivery date", and "paper selection". FIG. 10 exemplifies, as specific examples of the past printing request information stored in the database (e.g., the request record DB 131 of FIG. 2), past printing request information indicating that the customer name was "company A", the product attribute was "poster", the paper size was "A4", color or monochrome was "color", the basis weight was "slightly thick", the texture was "gloss", the number of copies was "500", the unit price (cent) was "5", the delivery date was "1/13/2022 (Jan. 13, 2022)", and the paper selection was "high-quality paper of manufacturer AA", and past printing request information indicating that the customer name was "company B", the product attribute was "magazine", the paper size was "A2", color or monochrome was "color", the basis weight was "thin", the texture was "gloss", the number of copies was "250", the unit price (cent) was "2", the delivery date was "2/12/2022 (Feb. 12, 2022)", and the paper selection was "none".

FIG. 11 illustrates a specific example of the printing record information stored in the database.

As illustrated in FIG. 11, the printing record information includes information on "customer name", "product attribute", "paper size", "color/monochrome", "basis weight", "texture", "number of copies", "unit price (cent)", "paper type", "delivery date", and "order reception date". FIG. 11 exemplifies, as specific examples of the printing record information stored in the database (e.g., the printing record DB 132 of FIG. 2), printing record information indicating that the customer name was "company A", the product attribute was "poster", the paper size was "A4", color or monochrome was "color", the basis weight was "slightly thick", the texture was "gloss", the number of copies was "500", the unit price (cent) was "5", the paper type was "high-quality paper of manufacturer AA", the delivery date was "2/1/2022 (Feb. 1, 2022)", and the order reception date was "1/13/2022 (Jan. 13, 2022)", and printing record information indicating that the customer name was "company B", the product attribute was "magazine", the paper size was "A2", color or monochrome was "color", the basis weight was "thin", the texture was "gloss", the number of copies was "250", the unit price (cent) was "2", the paper type was "large-size paper of manufacturer BB", the delivery date was "3/1/2022 (Mar. 1, 2022)", and the order reception date was "2/12/2022 (Feb. 12, 2022)".

FIG. 12 illustrates a specific example of the apparatus attribute information stored in the database.

As illustrated in FIG. 12, the apparatus attribute information includes information on "image forming apparatus", "quality", "speed", "color/monochrome", and "applied paper". FIG. 12 exemplifies, as specific examples of the apparatus attribute information stored in the database (e.g., the apparatus DB 133 of FIG. 2), apparatus attribute information indicating that the image forming apparatus is "printer A", the quality is "high", the speed is "150 ppm", color or monochrome is "color", and the applied paper is "large-size paper of manufacturer BB", and apparatus attribute information indicating that the image forming apparatus is "printer B", the quality is "medium", the speed is "100 ppm", color or monochrome is "monochrome", and the applied paper is "high-quality paper of manufacturer AA".

FIG. 13 illustrates a specific example of the paper stock information stored in the database.

As illustrated in FIG. 13, the paper stock information includes information on "paper type", "texture", "basis weight", "paper size", and "period to discard". FIG. 13 exemplifies, as specific examples of the paper stock information stored in the database (e.g., the paper stock DB 134 of FIG. 2), paper stock information indicating that the paper type is "high-quality paper of manufacturer AA", the texture is "matte", the basis weight is "slightly thick", the paper size is "A4", and the period to discard is "250 days", and paper stock information indicating that the paper type is "large-size paper of manufacturer BB", the texture is "gloss", the basis weight is "thin", the paper size is "A3", and the period to discard is "120 days".

FIG. 14 illustrates a specific example of the new printing request information stored in the database.

As illustrated in FIG. 14, the new printing request information includes information on "customer name", "product attribute", "paper size", "color/monochrome", "basis weight", "texture", "number of copies", "unit price (cent)", "delivery date", and "paper selection". FIG. 14 exemplifies, as specific examples of the new printing request information stored in the database (e.g., the request record DB 131 of FIG. 2), new printing request information indicating that the customer name is "company C", the product attribute is "calendar", the paper size is "B3", color or monochrome is "color", the basis weight is "slightly thick", the texture is "matte", the number of copies is "400", the unit price (cent) is "4", the delivery date is "3/31/2022 (Mar. 31, 2022)", and the paper selection is "large-size paper of manufacturer CC", and new printing request information indicating that the customer name is "company D", the product attribute is "flyer", the paper size is "A4", color or monochrome is "color", the basis weight is "thin", the texture is "plain", the number of copies is "1000", the unit price (cent) is "4", the delivery date is "6/30/2022 (Jun. 30, 2022)", and the paper selection is "none".

FIG. 15 illustrates a specific example of the weighting criteria.

As illustrated in FIG. 15, the weighting criteria describe "ranks of weighting". Specifically, the weighting criteria describe that the first rank of weighting is "period to delivery", the second rank is "quality", and the third rank is "average unit price per sheet". In the example of FIG. 15, the weighting criteria prescribe that the first rank of weighting is delivery, the second rank is quality, and the third rank is cost.

The weighting criteria describe standards for the individual ranks of weighting. For example, the weighting criterion of "period to delivery" at the first rank of weighting describes that standard days to the delivery date are 14 days. If the delivery date is weighted, candidates for paper and an image forming apparatus 50 are extracted based on whether the period to delivery is longer than 14 days, exactly 14 days, or shorter than 14 days.

The weighting criterion of "quality" at the second rank of weighting describes that the standard value of the basis weight is 50 g/m². If the quality is weighted, candidates for paper and an image forming apparatus 50 are extracted based on whether the basis weight is larger than 50 g/m², exactly 50 g/m², or smaller than 50 g/m². Specifically, if the basis weight is larger than 50 g/m², paper having a texture "gloss/matte" is extracted as a candidate. If the basis weight is exactly 50 g/m 2 or smaller than 50 g/m², paper having a texture "plain" is extracted as a candidate.

The weighting criterion of "average unit price per sheet" at the third rank of weighting describes that the standard unit price per sheet of paper is 1 cent. If the cost is weighted, candidates for paper and an image forming apparatus 50 are extracted based on whether the unit price per sheet of paper is larger than 1 cent, exactly 1 cent, or smaller than 1 cent.

FIG. 16 illustrates a specific example of the paper candidate information.

As illustrated in FIG. 16, the paper candidate information includes information on "customer name", "product attribute", "paper size", "color/monochrome", "number of copies", "paper selection", "paper name", "basis weight (g/m²)", "texture", "finishing selection", "post-processing", "cost estimation", "amount (dollar)", "delivery date", and "order reception date". The items "finishing selection" and "post-processing" are pieces of information indicating "quality" among the elements related to printing. The items "cost estimation" and "amount (dollar)" are pieces of information indicating "cost" among the elements related to printing. The items "delivery date" and "order reception date" are pieces of information indicating "delivery" among the elements related to printing.

FIG. 16 exemplifies, as specific examples of the paper candidate information, paper candidate information indicating that the customer name is "company A", the product attribute is "poster", the paper size is "A4", color or monochrome is "color", the number of copies is "500", the paper selection is "Yes", the paper name is "high-quality paper of manufacturer AA", the finishing selection is "high quality", the post-processing is "Yes", the cost estimation is "No", the delivery date is "2/1/2022 (Feb. 1, 2022)", and the order reception date is "1/13/2022 (Jan. 13, 2022)", and paper candidate information indicating that the customer name is "company B", the product attribute is "magazine", the paper size is "A5", color or monochrome is "color", the number of copies is "250", the paper selection is "No", the basis weight (g/m²) is "52", the finishing selection is "none", the post-processing is "No", the cost estimation is "Yes", the amount (dollar) is "2000", the delivery date is "3/1/2022 (Mar. 1, 2022)", and the order reception date is "2/12/2022 (Feb. 12, 2022)".

FIG. 17 illustrates a list of patterns to be used for extracting candidates for paper to be used for printing and indicating whether the elements are the same or different between the new printing request information and the printing record information.

FIG. 17 illustrates eight patterns indicating whether the elements that are the quality, the cost, and the delivery are the same or different between the new printing request information and the printing record information. Specifically, the patterns are a pattern indicating that the quality (Q), the cost (C), and the delivery (D) are "same" (hereinafter referred to as "pattern 1"), a pattern indicating that the delivery is "different" (hereinafter referred to as "pattern 2"), a pattern indicating that the cost is "different" (hereinafter referred to as "pattern 3"), a pattern indicating that the quality is "different" (hereinafter referred to as "pattern 4"), a pattern indicating that the quality and the cost are "different" (hereinafter referred to as "pattern 5"), a pattern indicating that the quality and the delivery are "different"

(hereinafter referred to as "pattern 6"), a pattern indicating that the cost and the delivery are "different" (hereinafter referred to as "pattern 7"), and a pattern indicating that the quality (Q), the cost (C), and the delivery (D) are "different" (hereinafter referred to as "pattern 8").

In the pattern 1 out of the patterns 1 to 8 illustrated in FIG. 17, the quality (Q), the cost (C), and the delivery (D) are "same". Therefore, paper in the past printing record is extracted as a candidate for paper to be used for printing related to the newly received printing request. In the pattern 2 in which the period to the delivery date in the newly received printing request is shorter than the period to the delivery date in the past printing record, the newly received printing request provides a narrow margin to the delivery date. Therefore, paper and an image forming apparatus 50 having priority on the delivery are extracted as candidates for paper and an image forming apparatus 50 to be used for printing related to the newly received printing request. In the pattern 2 in which the period to the delivery date in the newly received printing request is longer than the period to the delivery date in the past printing record, the newly received printing request provides a wide margin to the delivery date. Therefore, paper and an image forming apparatus 50 having priority on the quality are extracted as candidates for paper and an image forming apparatus 50 to be used for printing related to the newly received printing request.

In the pattern 3 in which the estimated cost in the newly received printing request is more than the estimated cost in the past printing record, the newly received printing request provides a wide margin to the estimated cost. Therefore, paper having priority on the quality is extracted as a candidate for paper to be used for printing related to the newly received printing request. In the pattern 3 in which the estimated cost in the newly received printing request is less than the estimated cost in the past printing record, the newly received printing request provides a narrow margin to the estimated cost. Therefore, paper having priority on the cost is extracted as a candidate for paper to be used for printing related to the newly received printing request.

In the pattern 4 in which the requested quality in the newly received printing request is higher than the requested quality in the past printing record, the quality is weighted in the newly received printing request. Therefore, paper having priority on the quality is extracted as a candidate for paper to be used for printing related to the newly received printing request. In the pattern 4 in which the requested quality in the newly received printing request is lower than the requested quality in the past printing record, the cost is weighted over the quality in the newly received printing request. Therefore, paper having priority on the cost is extracted as a candidate for paper to be used for printing related to the newly received printing request.

In the pattern 5 in which the requested quality in the newly received printing request is higher than the requested quality in the past printing record and the estimated cost in the newly received printing request is more than the estimated cost in the past printing record, the quality is weighted in the newly received printing request. Therefore, paper having priority on the quality and expected to have value added by post-processing (e.g., bookbinding) is extracted as a candidate for paper to be used for printing related to the newly received printing request.

In the pattern 5 in which the requested quality in the newly received printing request is higher than the requested quality in the past printing record and the estimated cost in the newly received printing request is less than the estimated cost in the past printing record, the currently best quality is requested under the tight cost estimation in the newly received printing request. Therefore, paper expected to meet the quality requested by the requester is extracted as a candidate for paper to be used for printing related to the newly received printing request.

In the pattern 5 in which the requested quality in the newly received printing request is lower than or approximately equal to the requested quality in the past printing record and the estimated cost in the newly received printing request is more than the estimated cost in the past printing record, the newly received printing request provides a wide margin to the estimated cost. Therefore, paper having priority on the quality is extracted as a candidate for paper to be used for printing related to the newly received printing request.

In the pattern 5 in which the requested quality in the newly received printing request is lower than or approximately equal to the requested quality in the past printing record and the estimated cost in the newly received printing request is less than the estimated cost in the past printing record, the newly received printing request provides a narrow margin to the estimated cost. Therefore, paper having priority on the cost is extracted as a candidate for paper to be used for printing related to the newly received printing request.

In the pattern 6 in which the requested quality in the newly received printing request is higher than the requested quality in the past printing record and the period to the delivery date in the newly received printing request is longer than the period to the delivery date in the past printing record, the quality is weighted in the newly received printing request. Therefore, paper and an image forming apparatus 50 having priority on the quality are extracted as candidates for paper and an image forming apparatus 50 to be used for printing related to the newly received printing request.

In the pattern 6 in which the requested quality in the newly received printing request is higher than the requested quality in the past printing record and the period to the delivery date in the newly received printing request is shorter than the period to the delivery date in the past printing record, the quality and the delivery are weighted in the newly received printing request. Therefore, paper expected to meet the quality requested by the requester and an image forming apparatus 50 having priority on the delivery are extracted as candidates for paper and an image forming apparatus 50 to be used for printing related to the newly received printing request.

In the pattern 6 in which the requested quality in the newly received printing request is lower than or approximately equal to the requested quality in the past printing record and the period to the delivery date in the newly received printing request is longer than the period to the delivery date in the past printing record, the quality and the delivery are not particularly requested in the newly received printing request. Therefore, paper used in printing related to the previous printing request or paper equivalent to this paper is extracted as a candidate for paper to be used for printing related to the newly received printing request.

In the pattern 6 in which the requested quality in the newly received printing request is lower than or approximately equal to the requested quality in the past printing record and the period to the delivery date in the newly received printing request is shorter than the period to the delivery date in the past printing record, the newly received printing request provides a narrow margin to the delivery date. Therefore, paper and an image forming apparatus 50 having priority on the delivery are extracted as candidates for paper and an image forming apparatus 50 to be used for printing related to the newly received printing request.

In the pattern 7 in which the estimated cost in the newly received printing request is more than the estimated cost in the past printing record and the period to the delivery date in the newly received printing request is longer than the period to the delivery date in the past printing record, the newly received printing request provides wide margins to the estimated cost and the delivery date. Therefore, an image forming apparatus 50 operable during the period to the delivery and paper available for the image forming apparatus 50 are extracted as candidates for an image forming apparatus 50 and paper to be used for printing related to the newly received printing request.

In the pattern 7 in which the estimated cost in the newly received printing request is more than the estimated cost in the past printing record and the period to the delivery date in the newly received printing request is shorter than the period to the delivery date in the past printing record, the newly received printing request provides a narrow margin to the delivery date but a wide margin to the estimated cost. Therefore, an image forming apparatus 50 operable during the period to the delivery and paper available for the image forming apparatus 50 are extracted as candidates for an image forming apparatus 50 and paper to be used for printing related to the newly received printing request.

In the pattern 7 in which the estimated cost in the newly received printing request is less than the estimated cost in the past printing record and the period to the delivery date in the newly received printing request is longer than the period to the delivery date in the past printing record, the newly received printing request provides a narrow margin to the estimated cost but a wide margin to the delivery date. Therefore, paper in a large stock or in an old lot in the stock is extracted as a candidate for paper to be used for printing related to the newly received printing request.

In the pattern 7 in which the estimated cost in the newly received printing request is less than the estimated cost in the past printing record and the period to the delivery date in the newly received printing request is shorter than the period to the delivery date in the past printing record, the newly received printing request provides narrow margins to the estimated cost and the delivery date. Therefore, paper expected to meet the requested estimated cost and the requested delivery date is extracted as a candidate for paper to be used for printing related to the newly received printing request.

In the pattern 8, the quality (Q), the cost (C), and the delivery (D) are "different". Therefore, candidates for paper and an image forming apparatus 50 to be used for printing related to the newly received printing request are extracted without consideration of the past printing record.

(Other Exemplary Embodiments)

The configuration of the information processing system 1 illustrated in FIG. 1, the hardware configuration of the management server 10 illustrated in FIG. 2, and the hardware configuration of the image forming apparatus 50 illustrated in FIG. 3 are examples and are not particularly limited.

The functional configuration of the management server 10 illustrated in FIG. 4, the functional configuration of the receiver terminal 30 illustrated in FIG. 5, and the functional configuration of the image forming apparatus 50 illustrated in FIG. 6 are examples and are not particularly limited. As long as the information processing system 1 of FIG. 1 as a whole has the functions to execute the processes described above, the functional configurations to be employed for implementing the functions are not limited to the examples of FIGS. 4 to 6.

The order of the processing steps of the management server 10 illustrated in FIG. 7, the order of the processing steps of the receiver terminal 30 illustrated in FIG. 8, and the order of the processing steps of the image forming apparatus 50 illustrated in FIG. 9 are examples and are not particularly limited. Instead of the processes performed in time series in the illustrated order of steps, the processes may be performed in parallel or individually. The specific examples illustrated in FIGS. 10 to 17 are also examples and are not particularly limited.

In the exemplary embodiment described above, candidates for paper are extracted based on the quality, the cost, and the delivery that are the plurality of elements related to the printing, but may be extracted based on elements other than the quality, the cost, and the delivery. For example, candidates for paper may be extracted based on temperature and humidity related to the season and weather or preferences of the requester of printing work or the customer to which printed products are delivered as the elements to be considered by a skilled person of the printing work when selecting paper.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

(Appendix)

(((1)))

An information processing system comprising:

one or more processors configured to:

acquire past printing request information on a printing request received in a past, record information on a record of printing performed by a printer based on the past printing request information, and new printing request information on a newly received printing request; and present a candidate for paper to be used for printing related to the new printing request information based on the past printing request information, information included in the record information and related to paper used for the printing, and an attribute of paper to be used as a print medium, the attribute of paper being identified from the new printing request information.

(((2)))

The information processing system according to (((1))), wherein the one or more processors are configured to present the candidate for the paper based on:

a combination of a requester of the printing request received in the past, the requester being identified from the past printing request information, and the information on the paper used for the printing performed by the printer based on the printing request, the information on the paper being identified from the record information; and a combination of a receiver of the newly received printing request, the receiver being identified from the new printing request information, and the attribute of the paper to be used for the printing.

(((3)))

The information processing system according to (((1))) or (((2))), wherein the attribute of the paper comprises one or more pieces of information out of a size, a basis weight, and a texture of the paper.

(((4)))

The information processing system according to any one of (((1))) to (((3))), wherein the one or more processors are configured to present the candidate for the paper based on a plurality of elements related to the printing, the elements being identified from the new printing request information.

(((5)))

The information processing system according to (((4))), wherein the one or more processors are configured to present the candidate for the paper based on quality, cost, and delivery related to the printing as the plurality of elements.

(((6)))

The information processing system according to (((5))), wherein the one or more processors are configured to:

perform weighting on the quality, the cost, and the delivery related to the printing based on the record information and the new printing request information; and present the candidate for the paper based on a result of the weighting.

(((7)))

The information processing system according to (((6))), wherein the one or more processors are configured to:

further acquire stock information on a stock of the paper possessed by the receiver of the newly received printing request; and present the candidate for the paper based further on possessing periods for individual types or brands of the paper, the possessing periods being identified from the stock information.

(((8)))

The information processing system according to (((7))), wherein the one or more processors are configured to, if the result of the weighting shows that the cost is weighted among the plurality of elements, present a candidate for the paper expected to shorten the possessing period and reduce a requested price of the printing request.

(((9)))

The information processing system according to any one of (((6))) to (((8))), wherein the one or more processors are configured to present the candidate for the paper based on:

information on the printer that has performed the printing based on the printing request received in the past identified from the record information; and an attribute of a printer expected to perform the printing based on the newly received printing request identified from the new printing request information.

(((10)))

The information processing system according to (((9))), wherein an attribute of the printer identified from the information on the printer that has performed the printing based on the printing request received in the past comprises specifications, a price, and a printing speed for each brand of the paper used in the printing, and wherein the attribute of the printer expected to perform the printing based on the newly received printing request comprises specifications, a price, and a printing speed for each brand of the paper available in the printing.

(((11)))

The information processing system according to (((10))), wherein the one or more processors are configured to, if the result of the weighting shows that the delivery is weighted among the plurality of elements, present a candidate for a printer expected to complete the delivery in time and a candidate for paper printable by the printer based on the attribute of the printer that has performed the printing based on the printing request received in the past identified from the record information, the attribute of the printer expected to perform the printing based on the newly received printing request identified from the new printing request information, and a delivery date.

(((12)))

The information processing system according to (((10))), wherein the one or more processors are configured to, if the result of the weighting shows that the quality is weighted among the plurality of elements, present a candidate for a printer expected to obtain a printing result satisfying a predetermined quality and a candidate for paper printable by the printer based on the attribute of the printer that has performed the printing based on the printing request received in the past identified from the record information, and the attribute of the printer expected to perform the printing based on the newly received printing request identified from the new printing request information.

(((13)))

The information processing system according to any one of (((4))) to (((12))), wherein the one or more processors are configured to, if a combination of a requester of the newly received printing request and the attribute of the paper to be used for the printing based on the printing request is similar to a combination of a requester of the printing request received in the past and an attribute of the paper used for the printing based on the printing request, present the candidate for the paper based on a difference in the elements between the new printing request information and the record information corresponding to each other.

(((14)))

The information processing system according to (((13))), wherein the one or more processors are configured to:

perform weighting on quality, cost, and delivery related to the printing based on the printing request based on, as the difference in the elements, a difference in one or more elements out of the quality, the cost, and the delivery; and present the candidate for the paper based on a result of the weighting.

(((15)))

The information processing system according to (((14))), wherein the one or more processors are configured to perform the weighting based on a difference in the quality as the difference in the elements.

(((16)))

The information processing system according to (((15))), wherein the one or more processors are configured to, as for the difference in the quality:

weight the quality among the plurality of elements if a quality requested by the requester and identified from the new printing request information is higher than a quality identified from the record information; and weight the cost among the plurality of elements if the quality requested by the requester and identified from the new printing request information is lower than the quality identified from the record information.

(((17)))

The information processing system according to (((14))), wherein the one or more processors are configured to perform the weighting based on a difference in the cost as the difference in the elements.

(((18)))

The information processing system according to (((17))), wherein the one or more processors are configured to, as for the difference in the cost:

weight the quality among the plurality of elements if a requested price identified from the new printing request information is higher than a requested price identified from the record information; and weight the cost among the plurality of elements if the requested price identified from the new printing request information is lower than the requested price identified from the record information.

(((19)))

The information processing system according to (((14))), wherein the one or more processors are configured to perform the weighting based on a difference in the delivery as the difference in the elements.

(((20)))

The information processing system according to (((19))), wherein the one or more processors are configured to, as for the difference in the delivery:

weight the delivery among the plurality of elements if a period to a delivery date requested by the requester and identified from the new printing request information is shorter than a period to a delivery date identified from the record information; and weight the quality among the plurality of elements if the period to the delivery date requested by the requester and identified from the new printing request information is longer than the period to the delivery date identified from the record information.

(((21)))

A program causing a computer to execute a process comprising:

acquiring past printing request information on a printing request received in a past, record information on a record of printing performed by a printer based on the past printing request information, and new printing request information on a newly received printing request; and presenting a candidate for paper to be used for printing related to the new printing request information based on the past printing request information, information included in the record information and related to paper used for the printing, and an attribute of paper to be used as a print medium, the attribute of paper being identified from the new printing request information.

What is claimed is:

1. An information processing system comprising:
one or more processors configured to:
store past printing request information on a printing request received in a past, and record information on a record of printing performed by a printer based on the past printing request information,
receive new printing request information on a newly received printing request from a receiver terminal; and
transmit, to the receiver terminal, a candidate for paper to be used for printing related to the new printing request information, wherein
the candidate for paper is extracted from paper stored in a database based on the past printing request information, information included in the record information and related to paper used for the printing, and an attribute of paper to be used as a print medium, the attribute of paper being identified from the new printing request information.

2. The information processing system according to claim 1, wherein the one or more processors are configured to transmit the candidate for the paper based on:
a combination of a requester of the printing request received in the past, the requester being identified from the past printing request information, and the information on the paper used for the printing performed by the printer based on the printing request, the information on the paper being identified from the record information; and
a combination of a receiver of the newly received printing request, the receiver being identified from the new printing request information, and the attribute of the paper to be used for the printing.

3. The information processing system according to claim 2, wherein the attribute of the paper comprises one or more pieces of information out of a size, a basis weight, and a texture of the paper.

4. The information processing system according to claim 3, wherein the one or more processors are configured to transmit the candidate for the paper based on a plurality of elements related to the printing, the elements being identified from the new printing request information.

5. The information processing system according to claim 4, wherein the one or more processors are configured to transmit the candidate for the paper
based on quality, cost, and delivery related to the printing as the plurality of elements.

6. The information processing system according to claim 5, wherein the one or more processors are configured to:
perform weighting on the quality, the cost, and the delivery related to the printing based on the record information and the new printing request information; and
transmit the candidate for the paper based on a result of the weighting.

7. The information processing system according to claim 6, wherein the one or more processors are configured to:
further acquire stock information on a stock of the paper possessed by the receiver of the newly received printing request; and
transmit the candidate for the paper based further on possessing periods for individual types or brands of the paper, the possessing periods being identified from the stock information.

8. The information processing system according to claim 7, wherein the one or more processors are configured to, if the result of the weighting shows that the cost is weighted among the plurality of elements, transmit a candidate for the paper expected to shorten the possessing period and reduce a requested price of the printing request.

9. The information processing system according to claim 8, wherein the one or more processors are configured to present the candidate for the paper based on:

information on the printer that has performed the printing based on the printing request received in the past identified from the record information; and an attribute of a printer expected to perform the printing based on the newly received printing request identified from the new printing request information.

10. The information processing system according to claim 9, wherein an attribute of the printer identified from the information on the printer that has performed the printing based on the printing request received in the past comprises specifications, a price, and a printing speed for each brand of the paper used in the printing, and wherein the attribute of the printer expected to perform the printing based on the newly received printing request comprises specifications, a price, and a printing speed for each brand of the paper available in the printing.

11. The information processing system according to claim 10, wherein the one or more processors are configured to, if the result of the weighting shows that the delivery is weighted among the plurality of elements, present a candidate for a printer expected to complete the delivery in time and a candidate for paper printable by the printer based on the attribute of the printer that has performed the printing based on the printing request received in the past identified from the record information, the attribute of the printer expected to perform the printing based on the newly received printing request identified from the new printing request information, and a delivery date.

12. The information processing system according to claim 10, wherein the one or more processors are configured to, if the result of the weighting shows that the quality is weighted among the plurality of elements, present a candidate for a printer expected to obtain a printing result satisfying a predetermined quality and a candidate for paper printable by the printer based on the attribute of the printer that has performed the printing based on the printing request received in the past identified from the record information, and the attribute of the printer expected to perform the printing based on the newly received printing request identified from the new printing request information.

13. The information processing system according to claim 12, wherein the one or more processors are configured to, if a combination of a requester of the newly received printing request and the attribute of the paper to be used for the printing based on the printing request is similar to a combination of a requester of the printing request received in the past and an attribute of the paper used for the printing based on the printing request, transmit the candidate for the paper based on a difference in the elements between the new printing request information and the record information corresponding to each other.

14. The information processing system according to claim 13, wherein the one or more processors are configured to:

perform weighting on quality, cost, and delivery related to the printing based on the printing request based on, as the difference in the elements, a difference in one or more elements out of the quality, the cost, and the delivery; and transmit the candidate for the paper based on a result of the weighting.

15. The information processing system according to claim 14, wherein the one or more processors are configured to perform the weighting based on a difference in the quality as the difference in the elements.

16. The information processing system according to claim 15, wherein the one or more processors are configured to, as for the difference in the quality:

weight the quality among the plurality of elements if a quality requested by the requester and identified from the new printing request information is higher than a quality identified from the record information; and weight the cost among the plurality of elements if the quality requested by the requester and identified from the new printing request information is lower than the quality identified from the record information.

17. The information processing system according to claim 14, wherein the one or more processors are configured to perform the weighting based on a difference in the cost as the difference in the elements.

18. The information processing system according to claim 17, wherein the one or more processors are configured to, as for the difference in the cost:

weight the quality among the plurality of elements if a requested price identified from the new printing request information is higher than a requested price identified from the record information; and weight the cost among the plurality of elements if the requested price identified from the new printing request information is lower than the requested price identified from the record information.

19. The information processing system according to claim 14, wherein the one or more processors are configured to perform the weighting based on a difference in the delivery as the difference in the elements.

20. The information processing system according to claim 19, wherein the one or more processors are configured to, as for the difference in the delivery:

weight the delivery among the plurality of elements if a period to a delivery date requested by the requester and identified from the new printing request information is shorter than a period to a delivery date identified from the record information; and weight the quality among the plurality of elements if the period to the delivery date requested by the requester and identified from the new printing request information is longer than the period to the delivery date identified from the record information.

21. A non-transitory computer readable medium storing a program causing a computer to execute a process comprising:

storing past printing request information on a printing request received in a past, and record information on a record of printing performed by a printer based on the past printing request information, receiving new printing request information on a newly received printing request from a receiver terminal; and transmitting, to the receiver terminal, a candidate for paper to be used for printing related to the new printing request information , wherein the candidate for paper is extracted from paper stored in a database based on the past printing request information, information included in the record information and related to paper used for the printing, and an attribute of paper to be used as a print medium, the attribute of paper being identified from the new printing request information.

* * * * *